Figure 1:
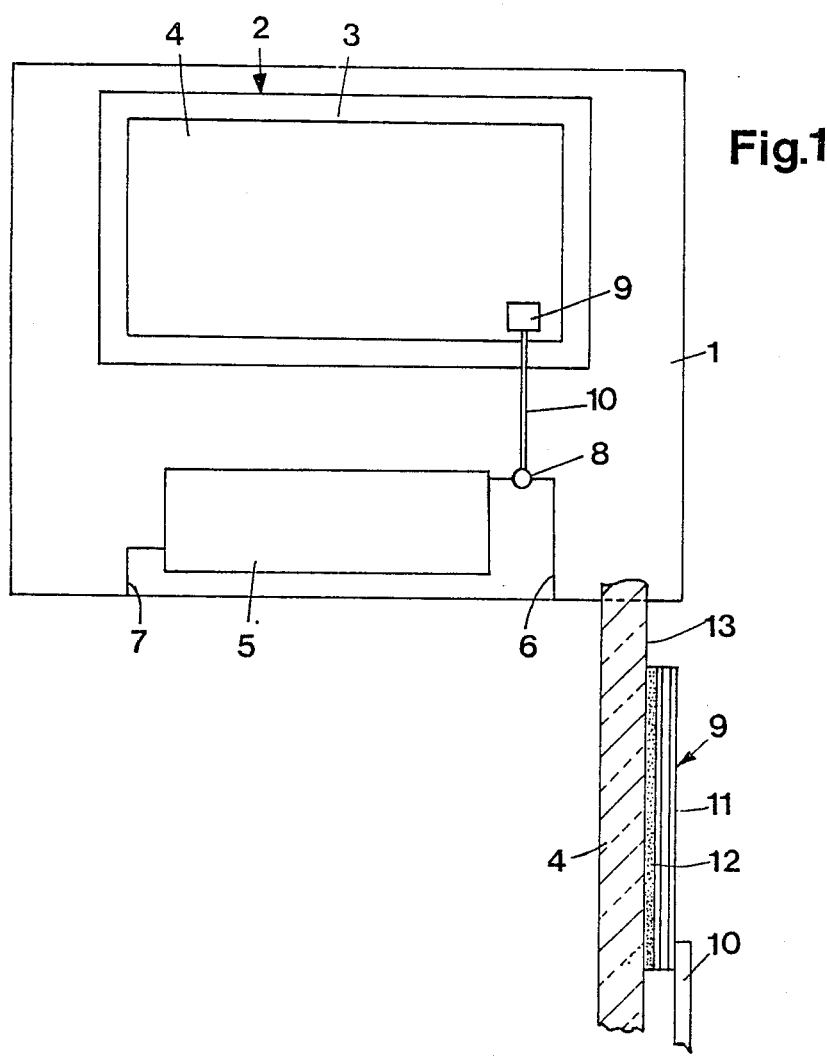

United States Patent [19]

Hansen

[11] Patent Number: 4,760,954

[45] Date of Patent: Aug. 2, 1988

[54] AUXILIARY EQUIPMENT FOR THE THERMOSTATIC VALVE OF A RADIATOR

[75] Inventor: Allan H. Hansen, Sonderborg, Denmark

[73] Assignee: Danfoss A/S, Nordborg, Denmark

[21] Appl. No.: 105,481

[22] Filed: Sep. 30, 1987

Related U.S. Application Data

[63] Continuation of Ser. No. 898,853, Aug. 19, 1986, abandoned, which is a continuation of Ser. No. 801,208, Nov. 25, 1985, abandoned.

[51] Int. Cl.$^4$ .............................................. F24F 11/00
[52] U.S. Cl. ...................................... 236/42; 236/68 B
[58] Field of Search ................... 236/42, 68 B, 91 C, 236/68 P, 91 R; 374/32; 165/28

[56] References Cited

U.S. PATENT DOCUMENTS

| | | | |
|---|---|---|---|
| 2,701,128 | 2/1955 | Gillick et al. | 236/68 B X |
| 3,246,839 | 4/1966 | Steghardt et al. | 236/91 C |
| 3,768,059 | 10/1973 | Day | 236/91 R |
| 4,020,897 | 5/1977 | Enter | 236/91 C X |
| 4,058,254 | 11/1977 | Hallgreen | 236/68 B |
| 4,149,902 | 4/1979 | Mauer et al. | 136/206 X |
| 4,274,475 | 6/1981 | Rall et al. | 374/109 X |
| 4,441,405 | 4/1984 | Takeuchi | 374/32 X |
| 4,555,764 | 11/1985 | Kuehn | 374/29 X |

FOREIGN PATENT DOCUMENTS

| | | | |
|---|---|---|---|
| 3000388 | 7/1981 | Fed. Rep. of Germany | 236/42 |
| 3042970 | 7/1982 | Fed. Rep. of Germany | 236/68 R |

*Primary Examiner*—William E. Wayner
*Attorney, Agent, or Firm*—Wayne B. Easton

[57] ABSTRACT

The invention relates to a heating system of the type in which a radiator in a room has the flow of a heated fluid thereto from a central source such as a boiler controlled by a thermostatic valve. The valve normally has a sensor associated therewith to which the valve reacts which senses room temperature. An electrical heating resistor is positioned in close proximity to the sensor. A solar cell positioned as in a window so as to be impinged upon by rays of the sun is electrically connected to the heating resistor and the resulting current developed by the solar cell is utilized to effect a heating of the resistor which is related to the intensity and angle of the sun's rays. The heat generated by the resistor supplements the sensed room temperature so that the valve is operated in a way which takes into account the radiant energy to which a room is subjected by the sun.

6 Claims, 1 Drawing Sheet

U.S. Patent  Aug. 2, 1988  4,760,954

AUXILIARY EQUIPMENT FOR THE THERMOSTATIC VALVE OF A RADIATOR

This application is a continuation of 898,853, filed 8/19/86, which is a continuation of 801,208, filed 11/25/85, both now abandoned.

The invention relates to auxiliary equipment for the thermostatic valve of a radiator in which the sensor is associated with a heating resistor which is connected to a current source and can be fed with heating energy depending on the radiation.

In known auxiliary equipment of this kind (DE-PS 26 25 420), the heating resistor is provided with current from the mains when a light sensor on the cover of the thermostatic valve receives no light. This results in fully automatic night reduction in the room temperature but this is automatically interrupted if the room is used at night and the light is switched on. The heating resistor, the light-sensitive switching apparatus and the cable fitted with a mains plug form a unit with which the thermostatic valve could be equipped subsequently.

These and other thermostatic valves normally work in response to the room temperature. If the temperature of the room rises as a result of foreign heat sources, especially sun rays, the amount of heat supplied to the radiator is throttled automatically. In relation to sun rays, this means that the thermostatic valve will respond only when the air in the room has been adequately heated by the energy of the sun. Generally, this results in hunting of the room temperature.

To take the radiation of heat into account, it is also already known (DE-OS No. 19 21 570), to provide the sensor of the thermostatic valve at least partially with a surface that absorbs radiation. In this way, the sensor is not only under the influence of the room temperature but also under the influence of the mean radiation temperature which depends on the condition of the wall surfaces, window surfaces, radiator surfaces, etc. insofar that their radiation reaches the sensor. In this way, it is intended to adapt to the feeling of comfort of a person located in the room.

It is the problem of the invention to provide auxiliary equipment for the thermostatic valve or a radiator that to a large extent prevents hunting of the room temperature on the occurrence of sunlight.

This problem is solved in accordance with the invention on the basis of the auxiliary equipment mentioned at the outset in that the current source is a solar cell which can be impinged by sun rays.

With the aid of this solar cell, the heating resistor is provided with heating energy whenever the solar cell receives sunlight. As a result of the heating, the desired room temperature is reduced. This already occurs upon commencement of radiation from the sun. It is therefore not necessary for the air in the room to reach an elevated temperature before the thermostatic valve is throttled or shut off. Hunting of the room temperature is therefore to a large extent suppressed. In addition, the room temperature is kept at a lower value as long as there is radiation from the sun. This takes into account the comfort of a person who, when subjected to heat radiation, will find a lower air temperature to be more pleasant.

Preferably, the solar cell is mounted at the window. This is where it is particularly strongly subjected to radiation from the sun.

Advantageously, the solar cell is applied to the inside of a window pane. On the other hand, the solar cell can be readily applied at this position and on the other hand it is impinged by sun rays to much the same extent as the sun affects the room. The more oblique the radiations, the less will be their influence on the room, the smaller will be the heating energy by the solar cell, and the less will be the temperature reduction at the thermostatic valve.

It is advantageous if the window is disposed above the radiator to be regulated by the thermostatic valve. This will result in clearly defined association of the solar cell and radiator. In addition, one can use a short cable between the sensor and solar cell.

It will be sufficient for the solar cell to have an area of about 8 to 12 cm$^2$. In the case of modern solar cells, this size will suffice for moving the thermostatic valve from one limiting position to the other when there is direct radiation from the sun.

Desirably, the solar cell is provided with self-adhesive layers. It can then be easily applied to a window pane or a similar smooth surface. In some cases it is advantageous for the heating resistor to be preceded by an adjustable resistor. With the aid of this resistor, one can on site accurately adapt the auxiliary equipment to local conditions.

If the heating resistor is provided with a cable and is part of a unit that can be installed subsequently, a development of the invention provides for the solar cell to be equipped with means for securing it to the window and for fixing it to the cable. One will then obtain a unitary apparatus that can be subsequently installed without difficulty by the purchaser insofar that he applies the heating resistor to the thermostatic valve censor and the solar cell to the window.

Figure 2:
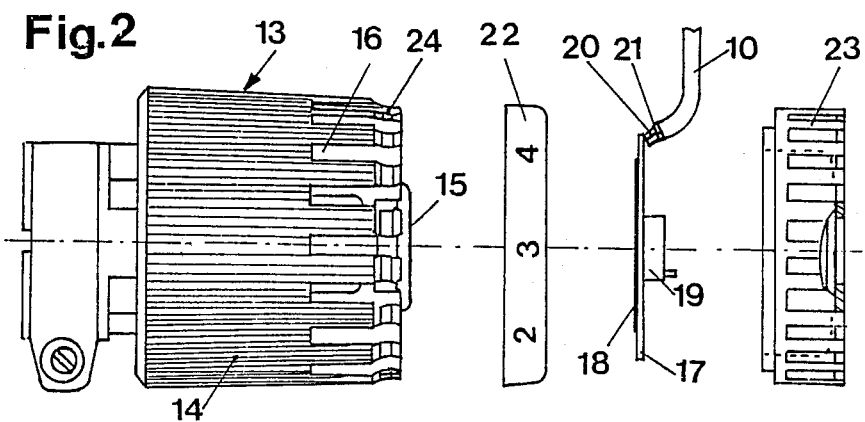

A preferred example of the invention will now be described in more detail with reference to the drawing, wherein:

FIG. 1 is a diagramatic representation of a radiator with a thermostatic valve having auxiliary equipment in accordance with the invention, and FIG. 2 shows the parts of the auxiliary equipment in conjunction with a thermostat attachment.

FIG. 1 diagrammatically illustrates a room 1 with a window 2 having a frame 3 and a window pane 4 of glass. Beneath the window there is a radiator 5 which is connected to hot water central heating by a supply line 6 and return line 7. The supply contains a thermostatic radiator valve 8 with a built-in sensor such as is known for example from DE-PS 26 25 420.

The window pane 4 has a solar cell 9 stuck to the inside at one corner, the cell being connected by a 2-core cable 10 to a thermostatic valve 8. The light sensitive parts face the pane. The adhesive layer is permeable to light or is disposed only at the edge of the solar cell.

As is shown in FIG. 2, the solar cell 9 consists of a conventional laminate 11 provided with a self-adhesive layer 12 so that it can be secured without effort to the inside 13 of the window pane 4. The thermostatic valve 8 has an attachment 13 which can be placed on a valve housing. Within a knob 14 there is an adjustable stem under the influence of a desired value spring on the one hand and the vapour pressure in bellows on the other hand. The vapour pressure depends on the temperature in a built-in sensor 15 which can be impinged by the room air by way of slots 16.

A plate 17 carries a heating resistor 18 which can be a laminar resistor. It is in series with an adjustable drop resistor 19. This series circuit is connected to the conductors 20 and 21 of cable 10. The plate 17 is secured between a graduated ring 22 and a cover 23. These parts together form a unit which can be secured on the bush 24 applied to the end of the knob 14. The heating resistor 18 will then be closely in front of the end face of the sensor 15 and will be able to heat same.

If the solar cell 9 is impinged by the sun, it produces a heating current which heats the heating resistor 18. This increases the temperature of the sensor 15 and the associated valve will be throttled or closed completely.

Even on commencement of the influence from the sun, therefore, the heat delivered by the radiator 5 will be reduced. Hunting of the room temperature will therefore not be possible.

The solar cell 9 is fixed to the one end of cable 10 by means of the adhesive layer 12. At the other end of cable 10, plate 17 is fixed to the heating resistor 18 by the graduated ring 22. The stated parts therefore form a unit that can be installed subsequently. For assembly, the unit consisting of the components 17, 22 and 23 need merely be applied to the thermostatic attachment 13 instead of the usual end cover. The solar cell 9 need merely be stuck to a window pane thereabove. The auxiliary equipment is then ready for operation.

The solar cell could also be applied to other parts of the window, for example to the outside of the window frame or on a window sill. The sensor 15 need not be built into the attachment 13. It could also be connected to it by way of a capillary tube. In that case, the heating resistor 18 is installed to the remote sensor.

I claim:

1. A room heating system for a room that has a window exposed to the sun, comprising, a radiator, a thermostatic valve for controlling the flow of heated liquid to said radiator, said valve including sensor means for sensing the ambient room temperature and regulating the throttling of heated liquid flowing through the radiator, a heating resistor mounted adjacent to the sensor means for heating the sensor means when an electric current is applied thereto, a solar cell positioned by the window for being impinged upon by rays of the sun and only when impinged upon, produce an electric current, the solar cell being electrically connected to the heating resistor to apply electric current thereto and being the sole source of electric current to the resistor.

2. A room heating system according to claim 1 in that the the radiator is located immediately below the window.

3. A room heating system according to claim 1 in that the valve includes a valve housing and means for mounting the heating resistor on the housing.

4. A room heating system according to claim 1 in that the solar cell has light sensitive parts facing the window.

5. A room heating system according to claim 4 in that the solar cell is provided with a self layer for attachment to the window.

6. A room heating system according to claim 5, characterized in that said solar cell has an area of about 8 to 12 cm$^2$.

* * * * *